US008869137B2

(12) United States Patent
Kaneko (10) Patent No.: US 8,869,137 B2
(45) Date of Patent: Oct. 21, 2014

(54) INFORMATION PROCESSING APPARATUS THAT AUTOMATICALLY AND SEQUENTIALLY DISPLAYS GRAPHICAL USER INTERFACE IMAGES AND RECORDING MEDIUM STORING PROGRAM

(75) Inventor: Kotaro Kaneko, Osaka (JP)

(73) Assignee: KYOCERA Documents Solutions Inc. (JP)

( * ) Notice: Subject to any disclaimer, the term of this patent is extended or adjusted under 35 U.S.C. 154(b) by 527 days.

(21) Appl. No.: 13/198,968

(22) Filed: Aug. 5, 2011

(65) Prior Publication Data
US 2012/0036505 A1  Feb. 9, 2012

(30) Foreign Application Priority Data

Aug. 5, 2010 (JP) .................................. 2010-176163

(51) Int. Cl.
*G06F 9/44* (2006.01)
*G06F 9/445* (2006.01)

(52) U.S. Cl.
CPC .............. *G06F 9/4443* (2013.01); *G06F 9/445* (2013.01)
USPC ........................... 717/174; 717/120; 718/102

(58) Field of Classification Search
CPC ............... G06F 8/03; G06F 8/20; G06F 8/38; G06F 8/34; G06F 9/52; G06F 9/4843; G06F 9/485; G06F 8/61; G06F 8/60; G06F 8/70; G06F 9/44; G06F 9/4443; G06F 9/46
See application file for complete search history.

(56) References Cited

U.S. PATENT DOCUMENTS 7,197,743 B2 *  3/2007  Borg et al. ..................... 717/120
7,761,847 B2 *  7/2010  Kornerup et al. ............. 718/102

(Continued)

FOREIGN PATENT DOCUMENTS

JP        10-154060        6/1998

OTHER PUBLICATIONS

J. A Bergstra and C.A. Middleburg; Instruction Sequences with Dynamically Instantiated Instruction; ACM; 1998; retrieved online on Jun. 9, 2014; pp. 1-25; Retrieved from the Internet: <URL: http://arxiv.org/pdf/0711.4217.pdf>.*

(Continued)

*Primary Examiner* — Thuy Dao
*Assistant Examiner* — Hanh T Bui
(74) *Attorney, Agent, or Firm* — McDonnell Boehnen Hulbert & Berghoff LLP (57) ABSTRACT

An information processing apparatus includes a display device; a storage device storing a program that includes a main program and N subsequent programs, and a subsequent processing code; and a processor displaying a GUI screen on the display device in accordance with the programs and writing program termination information in the storage device. The processor (a) terminates the main program after displaying a first GUI screen in accordance with the main program and executing the subsequent processing code, (b) displays a second GUI screen in accordance with a first subsequent program that is specified by the subsequent processing code on the basis of the program termination information and that is executed after the main program, and (c) sequentially displays third and subsequent GUI screens, in accordance with N−1 subsequent programs subsequent to the second subsequent program that is executed after the first subsequent program, until a termination condition is satisfied.

18 Claims, 5 Drawing Sheets

(56) References Cited

U.S. PATENT DOCUMENTS

| | | | | |
|---|---|---|---|---|
| 8,074,201 | B2* | 12/2011 | Ghercioiu et al. | 717/120 |
| 8,584,119 | B2* | 11/2013 | Ellington et al. | 717/174 |
| 8,713,570 | B2* | 4/2014 | Watanabe et al. | 717/168 |
| 2003/0115240 | A1* | 6/2003 | Cho | 709/102 |
| 2004/0148311 | A1* | 7/2004 | Sawada | 707/102 |
| 2006/0171732 | A1* | 8/2006 | Yamada | 399/81 |
| 2007/0283345 | A1* | 12/2007 | Fujishita | 717/174 |
| 2008/0229313 | A1* | 9/2008 | Motoyama et al. | 718/102 |
| 2011/0010690 | A1* | 1/2011 | Howard et al. | 717/120 |
| 2013/0081033 | A1* | 3/2013 | Levien et al. | 718/102 |

OTHER PUBLICATIONS

Steve Carr et al.; ThreadMentor: A Pedagogical Tool for Multithreaded Programming; ACM; Mar. 2003; retrieved online on Jun. 9, 2014; pp. 1-30; Retrieved from the Internet: <URL: http://delivery.acm.org/10.1145/960000/958796/p1-carr.pdf?>.*

Tom Morrow and Sumit Ghosh; DIVIDE:Distributed Visual Display of the Extension of Asynchronous, Distributed Algorithms on Loosely-Couple Parallel Processors; IEEE; 1993; retrieved online on Jun. 9, 2014; Retrieved from the Internet: <URL: http://ieeexplore.ieee.org/stamp/stamp.jsp?tp=&arnumber=398865>.*

* cited by examiner

| IDENTIFIER | RETURN VALUE |
|---|---|
| APPLICATION0 | 0 |

Fig. 3A

| IDENTIFIER | RETURN VALUE |
|---|---|
| APPLICATION0 | 0 |
| APPLICATION1 | 1 |

Fig. 3B

| IDENTIFIER | RETURN VALUE |
|---|---|
| APPLICATION0 | 0 |
| APPLICATION1 | 1 |
| APPLICATION2 | 0 |

| IF IDENTIFIER=APPLICATION0 : EXECUTE APPLICATION #1 PROGRAM |
| IF IDENTIFIER=APPLICATION1 : EXECUTE APPLICATION #2 PROGRAM |
| IF IDENTIFIER=APPLICATION2 : TERMINATE SUBSEQUENT PROCESSING CODE |

Fig. 5B

| IF IDENTIFIER=APPLICATION0 AND RETURN VALUE=1 : EXECUTE APPLICATION #1 PROGRAM |

# INFORMATION PROCESSING APPARATUS THAT AUTOMATICALLY AND SEQUENTIALLY DISPLAYS GRAPHICAL USER INTERFACE IMAGES AND RECORDING MEDIUM STORING PROGRAM

INCORPORATION BY REFERENCE

This application is based upon, and claims the benefit of priority from, corresponding Japanese Patent Application No. 2010-176163, filed in the Japan Patent Office on Aug. 5, 2010, the entire contents of which are incorporated herein by reference.

BACKGROUND

1. Field

The present invention is related to an information processing apparatus that automatically and sequentially displays graphical user interfaces (GUIs) of a plurality of programs and a non-transitory recording medium in which the programs are stored.

2. Description of the Related Art

Typically, information processing apparatuses represented by personal computers and electronic devices, such as multi-function printers (MFPs), printers, and copiers, have GUIs. With such typical information processing apparatuses, there is a need for sequentially executing a plurality of application programs and sequentially display the GUI screens corresponding to the application programs.

In such a case, usually a separate control program is used to sequentially execute the application programs (first method according to the related art). Alternatively, the first application program executed among the plurality of application programs may execute the other application programs (second method according to the related art).

In the case of the first method according to the related art, the user must manually execute the control program. Since the control program operates independently until the last application program is executed, resources are consumed by the control program.

In the case of the second method according to the related art, the GUI screen of the first executed application program and the GUI screens of the other application programs are displayed in parallel. When the GUI screen of the first executed application program is closed while other application programs are executed, the first executed application program cannot be terminated by the user operating the GUI screen of the first application program. Therefore, the GUI screen of the first executed application program must be displayed until the last executed application program is terminated.

SUMMARY

The present disclosure relates to an information processing apparatus that automatically and sequentially displays GUIs of a plurality of programs and a non-transitory recording medium in which the programs are stored.

An information processing apparatus includes a display device; a storage device configured to store a program and a subsequent processing code; and a processor. The processor is configured to execute the program to display a graphical user interface (GUI) screen on the display device in accordance with the program and to write program termination information in the storage device when the program is terminated. The program includes a main program and N subsequent programs, where N represents a natural number, and the processor is configured to (a) terminate the main program after displaying a first GUI screen on the display device in accordance with the main program and executing the subsequent processing code, (b) display a second GUI screen on the display device in accordance with a first subsequent program that is specified by the subsequent processing code on the basis of the program termination information and that is executed after the main program, and (c) sequentially display third and subsequent GUI screens on the display device, in accordance with N−1 subsequent programs subsequent to the second subsequent program that is executed after the first subsequent program, until a termination condition is satisfied.

A non-transitory recording medium stores a program including a main program and N subsequent programs, where N represents a natural number. The program causes a processor to execute the following steps: displaying a first graphical user interface (GUI) screen on a display device in accordance with the main program; terminating the main program after executing a subsequent processing code; writing program termination information in a storage device when the main program is terminated; displaying a second GUI screen on the display device in accordance with a first subsequent program that is specified by the subsequent processing code on the basis of the program termination information and that is executed after the main program; and sequentially displaying third and subsequent GUI screens on the display device, in accordance with N−1 subsequent programs subsequent to the second subsequent program that is executed after the first subsequent program, until a termination condition is satisfied.

Additional features and advantages are described herein, and will be apparent from the following detailed description and the figures.

DETAILED DESCRIPTION

First Embodiment

Figure 1:
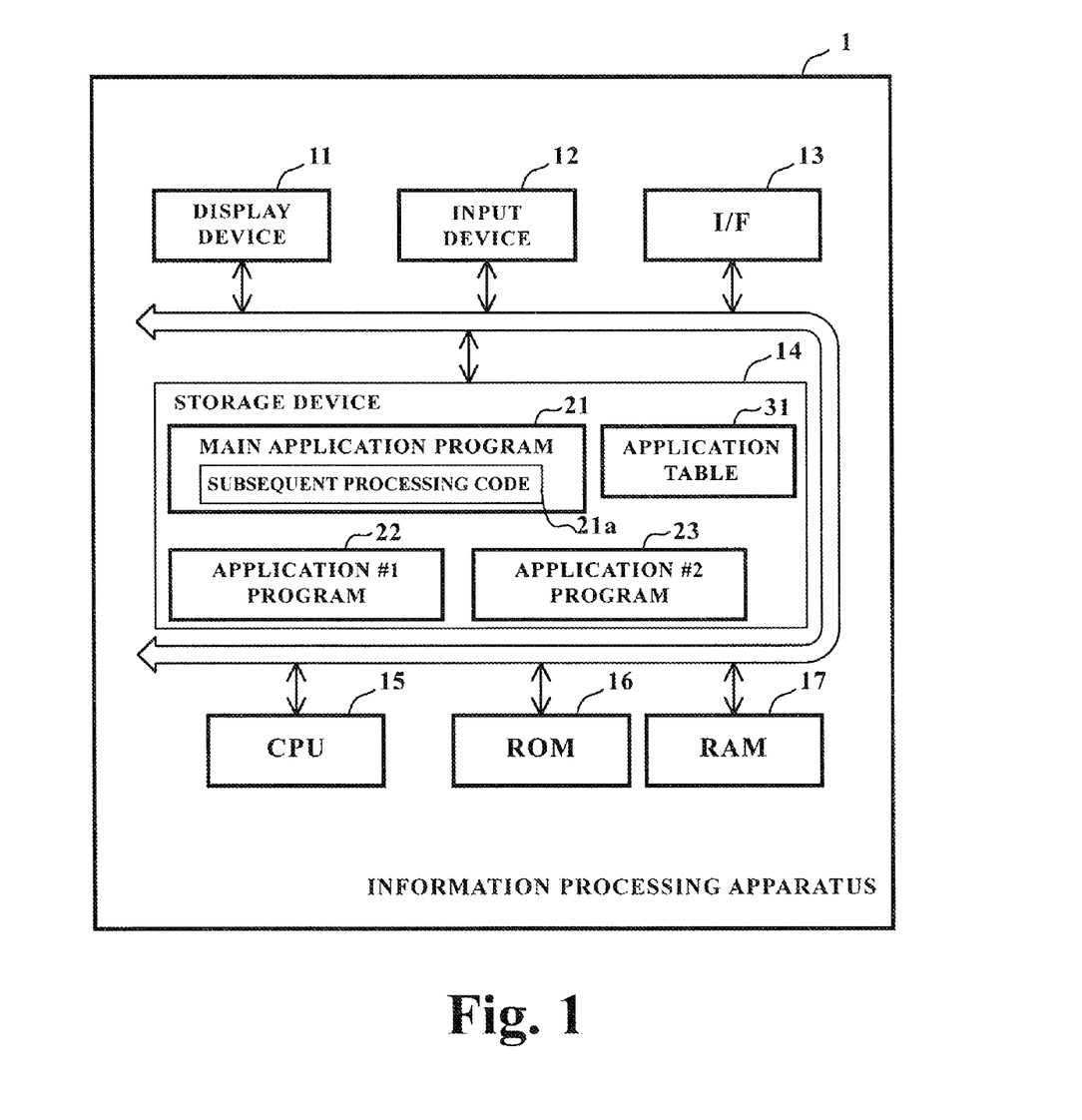
FIG. 1 shows a block diagram illustrating the configuration of an information processing apparatus according to a first embodiment.

FIG. 1 shows a block diagram illustrating the configuration of an information processing apparatus 1 according to the first embodiment.

The information processing apparatus 1 illustrated in FIG. 1 includes a computer that executes various programs to perform computation and process.

The information processing apparatus 1 may include, for example, a personal computer.

In the information processing apparatus 1, a display device 11 displays a GUI screen, such as an operation screen. The display device 11 may include, for example, a liquid crystal display. An input device 12 enables input through operation of the operation screen. The input device 12 may include, for example, a keyboard and a mouse. A graphic circuit (not illustrated) performs a drawing process and outputs video signals. The display device 11 displays a GUI screen in accordance with the video signals.

Data is transmitted between the display device 11 and the input device 12.

An interface 13 is a data communication circuit that is connected to peripheral devices or network devices. The interface 13 includes a peripheral-device interface, such as a universal serial bus (USB), or a network interface.

A storage device 14 is a device that includes a recording medium (not illustrated) in which an operation system, various programs, and various types of data are stored. The storage device 14 may include a non-volatile semiconductor memory, a hard-disk drive device, or a disc array device.

According to a first embodiment, the storage device 14 stores a main application program 21 (example of the main program), an application #1 program 22 (example of a subsequent program), an application #2 program 23 (example of another subsequent program), and an application table 31.

The main application program 21 executes a subsequent processing code 21a and displays the first GUI screen. The subsequent processing code 21a is a routine or a function that refers to the application table 31 and specifies and executes a subsequent program. In the first embodiment, the subsequent processing code 21a is included in the main application program 21.

The application #1 program 22 is executed subsequent to the main application program 21 and is a program for displaying the second GUI screen.

The application #2 program 23 is executed subsequent to the application #1 program 22 and is a program for displaying the third GUI screen.

The application table 31 is a table in which program termination information is written when the programs 21 to 23 are terminated. In the first embodiment, the program termination information includes identifiers and return values of terminated programs. The identifiers may include, for example, a program name (program file name, etc.).

The programs 21 to 23 may be recorded on a portable recording medium, such as a CD-ROM or a DVD-ROM, and may be provided via the recording medium. In such a case, the programs 21 to 23 are installed from the recording medium to the information processing apparatus 1.

A central processing unit (CPU) 15 is an example of a processor executing the process specified in the program. A read only memory (ROM) 16 is a non-volatile memory in which programs and data are pre-stored. A random access memory (RAM) 17 is a memory in which programs and data are temporarily stored while a program is executed. The CPU 15, the ROM 16, and the RAM 17 are interconnected via buses and controller chips and are further connected to the storage device 14, the interface 13, the graphic circuit of the display device 11, and the interface of the input device 12 via the buses and controller chips.

The CPU 15 loads the programs stored in the storage device 14 or the ROM 16 to the RAM 17 for execution.

Figure 2:
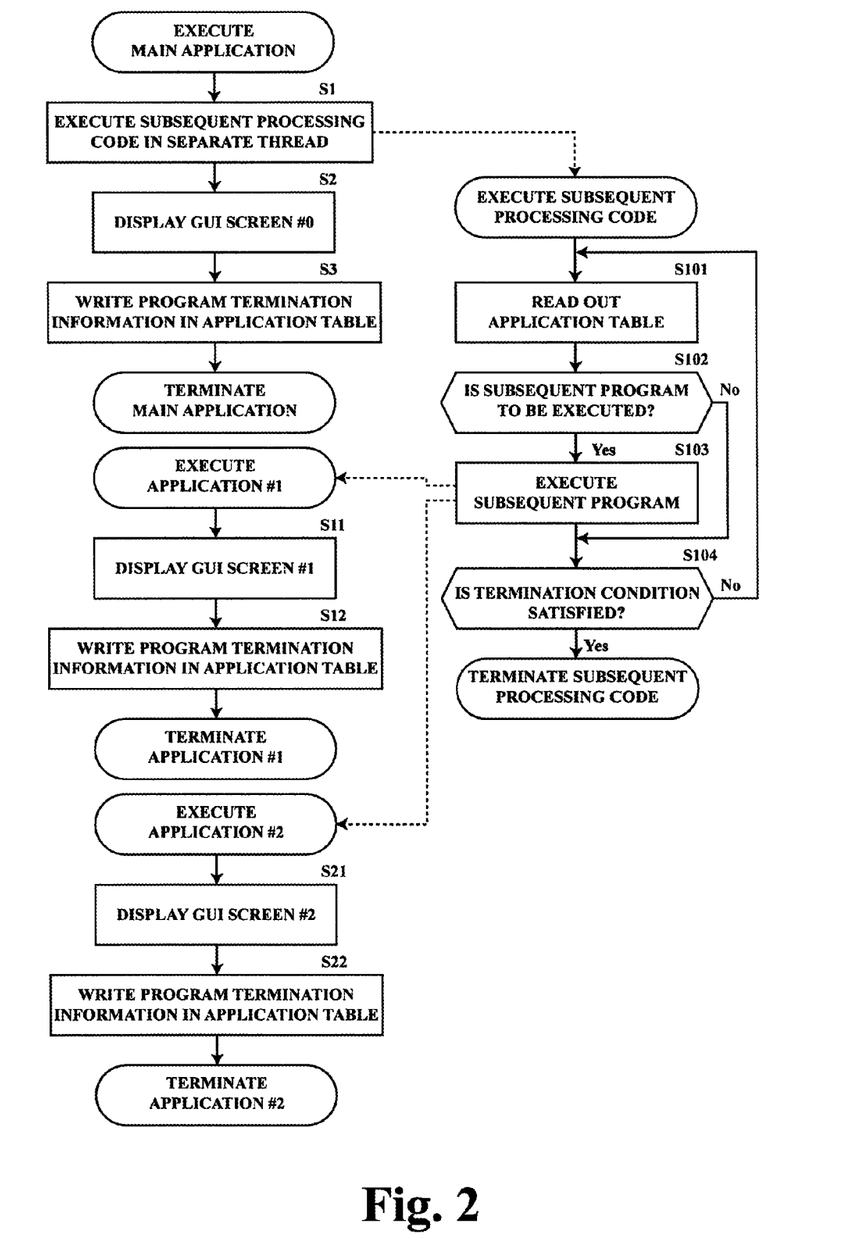
FIG. 2 shows a flow chart illustrating the operation of the information processing apparatus.
Figure 3A:
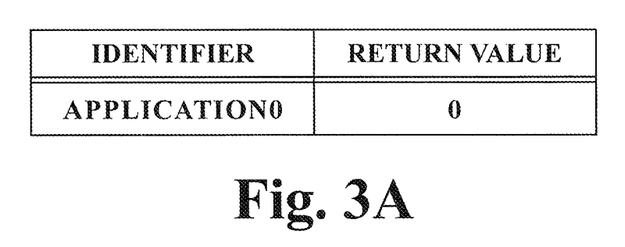
FIG. 3A shows a first example of an application table.
Figure 3B:
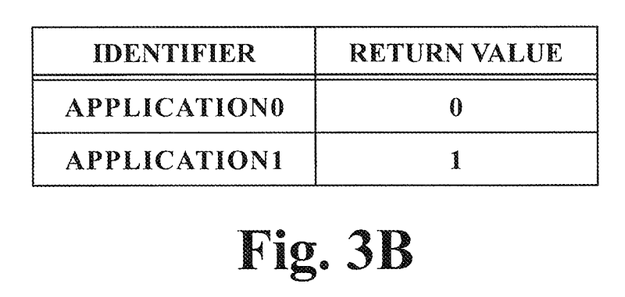
FIG. 3B shows a second example of the application table.
Figure 3C:
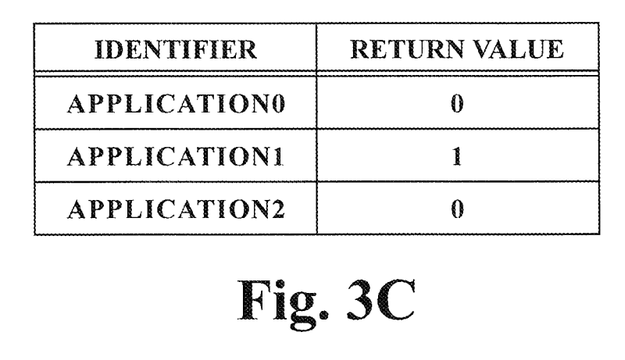
FIG. 3C shows a third example of the application table.
Figure 4:
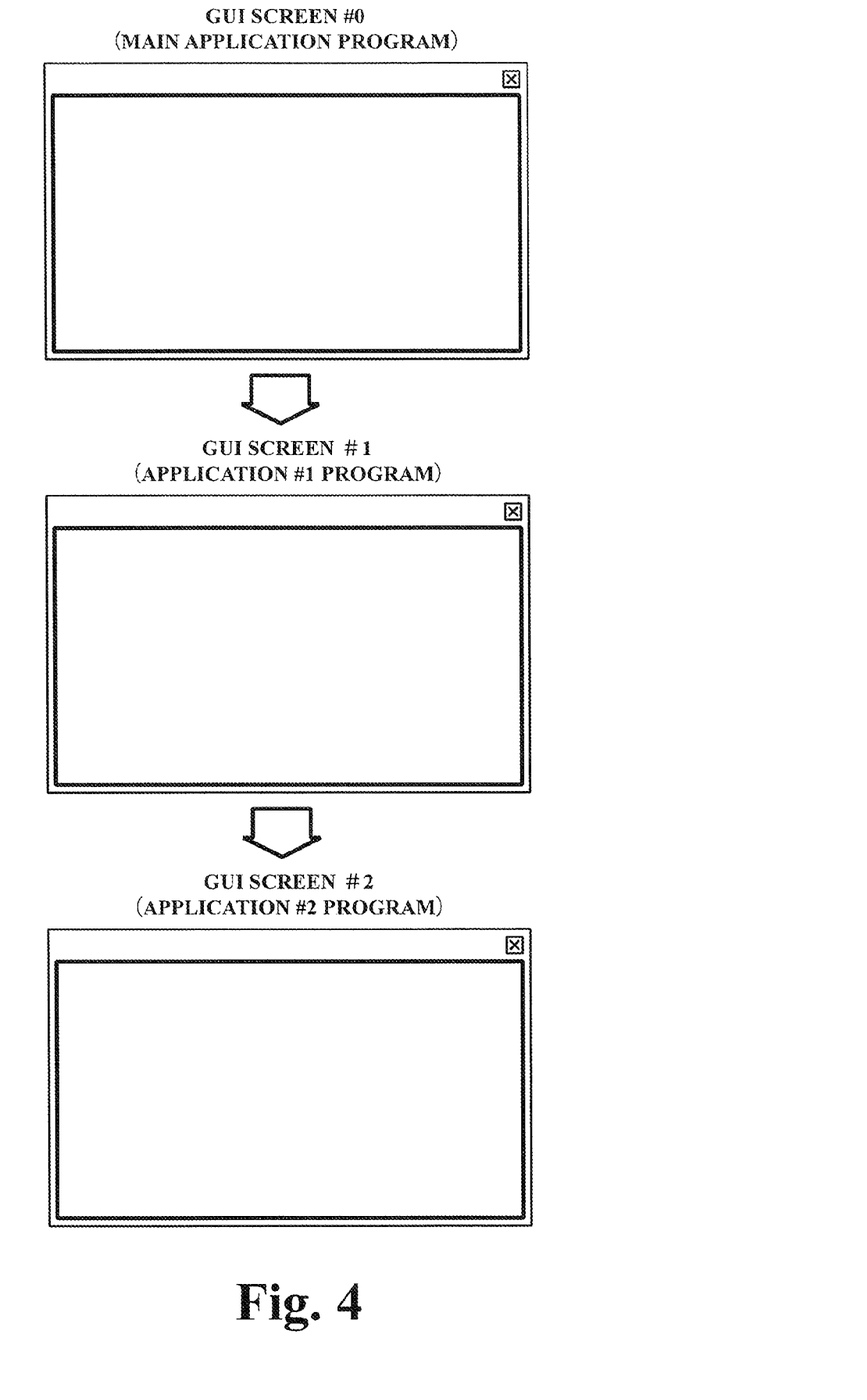
FIG. 4 shows the switching of GUI screens on the information processing apparatus.

FIG. 2 shows a flow chart illustrating the operation of the information processing apparatus 1. FIG. 3A shows the first example of the application table 31 stored in the information processing apparatus 1. FIG. 3B shows the second example of the application table 31. FIG. 3C shows the third example of the application table 31. FIG. 4 shows the switching of the GUI screens by the information processing apparatus 1.

When an execution request for the main application program 21 is generated, the CPU 15 loads the main application program 21 to the RAM 17 for execution.

The CPU 15 executes the subsequent processing code 21a in a separate thread in accordance with the main application program 21 (Step S1). The separate thread is different from the thread that displays a GUI screen #0, which is described below. In this way, since the process of the main program continues until the subsequent processing code ends even when the GUI screen of the main program is closed, the subsequent processing code continues for operation asynchronously with the GUI screen display.

The CPU 15 displays the GUI screen #0 on the display device 11 in accordance with the main application program 21 (Step S2).

When the operation by a user for instructing the termination of the main application program 21 is detected via the input device 12, the CPU 15 writes program termination information of the main application program 21 in the application table 31 (Step S3). The program termination information is the identifier of the main application program 21 and the return value indicating the execution result (such as normal termination or abnormal termination) of the main application program 21. For example, as illustrated in FIG. 3A, the identifier "APPLICATION0" and the return value "0" are written in.

When the program termination information is written in, the CPU 15 ends the main application program 21. In response, the GUI screen #0 is closed.

The CPU 15 executes the subsequent processing code 21a in the separate thread, periodically reads out the application table 31 in accordance with the subsequent processing code 21a (Step S101), and specifies the terminated programs and their return values on the basis of the application table 31 to determine whether to execute a subsequent program (Step S102).

In the first embodiment, the condition for the CPU 15 to determine whether to execute the subsequent program is pre-specified in the subsequent processing code 21a. The subsequent programs to be executed by the CPU 15 are linked to the identifiers and the return values written in the application table 31 and are pre-specified in the subsequent processing code 21a.

When the CPU 15 determines to execute a subsequent program, the CPU 15 specifies the subsequent program to be executed in accordance with the subsequent processing code 21a and executes the subsequent program (Step S103). Meanwhile, when the CPU 15 determines not to execute a subsequent program, the CPU 15 skips Step S103.

In accordance with the subsequent processing code 21a, the CPU 15 determines whether a termination condition is satisfied on the basis of the application table 31 (Step S104). When the termination condition is satisfied, the CPU 15 terminates the subsequent processing code 21a after deleting all program termination information in the application table 31. When the termination condition is not satisfied, the CPU 15 returns to Step S101 and periodically reads out the application table 31.

In the first embodiment, the subsequent processing code 21a is written to execute the programs 21, 22, and 23 corresponding to the main application program 21, the application #1 program 22, and the application #2 program 23 (in this order) and display the GUI screen #0, GUI screen #1, and GUI screen #2 (again in this order).

In accordance with the subsequent processing code 21a, when the program termination information of the main application program 21 is detected, as illustrated in FIG. 3A, the CPU 15 loads the application #1 program 22 in the RAM 17 and executes the application #1 program 22 as a separate process. The CPU 15 displays the GUI screen #1 on the display device 11 in accordance with the application #1 program 22 (Step S11).

When the operation by the user for ending the application #1 program 22 is detected via the input device 12, the CPU 15 writes the program termination information of the application #1 program 22 in the application table 31 (Step S12). As illustrated in FIG. 3B, in addition to the program termination information of the main application program 21, the identifier "APPLICATION1" and the return value "1" of the application #1 program 22 are written in.

When the program termination information is written in, the CPU 15 terminates the application #1 program 22. In this way, the GUI screen #1 is closed.

In accordance with the subsequent processing code 21a, when the program termination information of the application #1 program 22 is detected, as illustrated in FIG. 3B, the CPU 15 loads the application #2 program 23 in the RAM 17 and executes the application #2 program 23 in the separate process. The CPU 15 displays the GUI screen #2 on the display device 11 in accordance with the application #2 program 23 (Step S21).

Upon the operation by the user for ending the application #2 program 23 via the input device 12, the CPU 15 writes the program termination information of the application #2 program 23 in the application table 31 (Step S22). As illustrated in FIG. 3C, in addition to the program termination information of the main application program 21 and application #1 program 22, the identifier "APPLICATION2" and the return value "0" of the application #2 program 23 are written in.

When the program termination information is written in, the CPU 15 terminates the application #2 program 23. In this way, the GUI screen #2 is closed.

In accordance with the subsequent processing code 21a, when the program termination information of the application #2 program 23 is detected, as illustrated in FIG. 3C, the CPU 15 determines that the termination condition is satisfied (Step S104) and terminates the subsequent processing code 21a.

According to the above-described present disclosure, the GUI screens of the programs 21 to 23 are displayed in order, as illustrated in FIG. 4.

According to the first embodiment, the CPU 15 displays the GUI screen #0 on the display device 11 in accordance with the main application program 21, executes the subsequent processing code 21a, and terminates the main application program 21. In accordance with the subsequent processing code 21a, the CPU 15 executes a subsequent program (application #1 program 22) after the main application program 21 on the basis of the program termination information, and displays the GUI screen #1 on the display device 11 in accordance with the subsequent program. The CPU 15 executes subsequent programs and displays GUI screens on the display device 11 in accordance with the executed subsequent programs until the termination condition is satisfied.

In this way, the GUI screens of the programs 21 to 23 can be displayed in sequence without using the separate control program.

Second Embodiment

In the first embodiment, the condition of determining whether to execute the subsequent program and the designation of the subsequent program to be executed are pre-specified in the subsequent processing code 21a. In the second embodiment, the condition of determining whether to execute the subsequent program and the designation of the subsequent program to be executed are stored in the storage device 14 as a condition table in a separate file.

In the second embodiment, the CPU 15 reads out the condition table in accordance with the subsequent processing code 21a and executes the process of the above-described Steps S102 to S104 on the basis of the condition table.

Figure 5A:
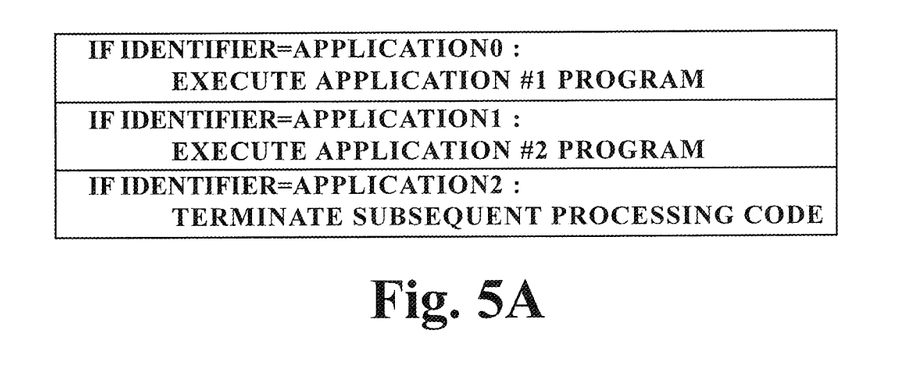
FIG. 5A shows a first example of a condition table according to a second embodiment.
Figure 5B:
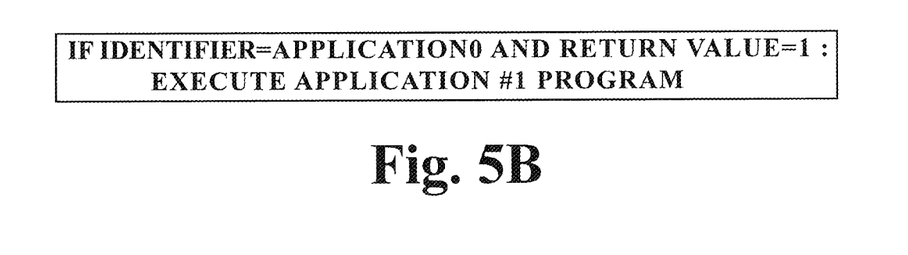
FIG. 5B shows a second example of the condition table according to the second embodiment.

FIG. 5A shows the first example of the condition table stored in the information processing apparatus 1 according to the second embodiment. FIG. 5B shows the second example of the condition table. FIG. 5A shows the condition table for executing, in the following order, the main application program 21, the application #1 program 22, and the application #2 program 23, which are described in the first embodiment. FIG. 5B shows the condition table including the return value.

The data format in the condition table is not limited to that illustrated in FIG. 5A and FIG. 5B, and may be any data format so long as a condition for specifying the value of program termination information (the identifier and/or the return value) in the application table 31 is included. Furthermore, the data in the condition table may include a specification of the action (designation of the program to be executed or termination of the subsequent processing code) to be executed when the condition is satisfied.

The configuration and operation of the information processing apparatus 1 according to the second embodiment are the same as or similar to those in the first embodiment except for those described above.

Third Embodiment

The configuration of the information processing apparatus 1 according to the third embodiment is the same as or similar to that according to the first or second embodiment. In the third embodiment, the programs 21 to 23 are part of a software development kit (SDK). The main application program 21 is a simulator of an electronic device to which a development program is installed (for example, an application program installed in an MFP after the MFP is mounted); the application #1 program 22 is a builder that compiles (builds) the development program; and the application #2 program 23 is a packaging tool that prepares an installation package of the development program.

For example, the result of operating the development program with the simulator (program 21) is written in the application table 31 as the return value of the simulator (program 21), and the subsequent builder (program 22) is executed when the return value indicates normal operation. Similarly, the result of compilation by the subsequent builder (program 22) is written in the application table 31 as the return value of the builder (program 22), and the subsequent packaging tool (program 23) is executed when the return value indicates normal operation.

According to the third embodiment, for example, an application vendor that develops an application program to be installed in the MFP can confirm the operation of the application program with the simulator (program 21), then compile the application program by operating the GUI screen of the automatically executed builder (program 22), and prepare an installation package by operating the GUI screen of the automatically executed packaging tool (program 23). In this way, the application vendor does not have to manually execute the builder (program 22) and the packaging tool (program 23) in this order after confirming the operation of the application program with the simulator (program 21).

Fourth Embodiment

The configuration of the information processing apparatus 1 according to the fourth embodiment is the same as or similar to that according to the first or second embodiment. In the fourth embodiment, the programs 21 to 23 are part of an SDK. The main application program 21 is the builder that compiles (builds) the development program to be installed in the electronic device; the application #1 program 22 is the packaging tool that prepares the installation package of the development program; and the application #2 program 23 is an installer for remotely installing (installing via a network) the development program to the electronic device using the installation package.

According to the fourth embodiment, for example, the application vendor that develops the application program to be installed in the MFP can compile the application program by operating the GUI screen of the builder (program 21), then prepare the installation package by operating the GUI screen of the automatically executed packaging tool (program 22), and then perform a remote installation by operating the GUI screen of the automatically executed installer (program 23). In this way, the application vendor does not have to manually execute the packaging tool (program 22) and the installer (program 23) in this order after compiling the application program with the builder (program 21).

The present disclosure of the embodiment includes various other embodiments. For example, other designs may be used in which the above-described components are each performed.

In the first to fourth embodiments, the execution of the subsequent program and the termination condition are determined on the basis of the program termination information of the single program. Alternatively, the execution of a subsequent program and the termination condition may be determined on the basis of program termination information of the plurality of programs. For example, when the program termination information of the main application program 21, the application #1 program 22, and the application #2 program 23 is detected, the CPU 15 may determine that the termination condition is satisfied and may terminate the subsequent processing code 21*a*.

In the first to fourth embodiments, the application table 31 may be stored in the other storage device, such as the RAM 17.

In the first to fourth embodiments, the subsequent processing code 21*a* is included in the main application program 21. The subsequent processing code 21*a* may be included in the application #1 program 22 and/or the application #2 program 23. In such a case, for example, when the subsequent processing code 21*a* is executed, the condition table may be specified such that the different condition table is used corresponding to the program 21, 22, or 23.

In the first to fourth embodiments, the CPU 15 may execute the subsequent processing code 21*a* when no program termination information is registered by referring to the application table 31 before executing the subsequent processing code 21*a*. Even when subsequent processing codes can be executed from a plurality of the programs, as described above, the program that is executed first may execute the subsequent processing code 21*a*, and the execution of the subsequent processing code 21*a* by subsequent programs can be prohibited. Additionally, in the case that the main application program 21 is executed a plurality of times, the subsequent processing code 21*a* is not executed on the subsequent execution of the main application program 21.

In the first to fourth embodiments, the subsequent processing code 21*a* may not be included in the main application program 21 but may instead be stored in the storage device 14 as a dynamic link library and read out from the program 21, 22, or 23.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An information processing apparatus comprising:
a display device;
a storage device configured to store a program and a subsequent processing code; and
a processor configured to execute the program to display a graphical user interface (GUI) screen on the display device in accordance with the program and to write program termination information in the storage device when the program is terminated,
wherein the program includes a main program and N subsequent programs, where N represents a natural number greater than one,
wherein the processor is configured to (a) terminate the main program after displaying a first GUI screen on the display device in a first thread in a process of the main program and executing the subsequent processing code in a second thread in the process of the main program, (b) display a second GUI screen on the display device in accordance with a first subsequent program that is specified by the subsequent processing code on the basis of the program termination information and is executed after the main program, and (c) sequentially display third and subsequent GUI screens on the display device, in accordance with N−1 subsequent programs subsequent to the second subsequent program that is executed after the first subsequent program, until a termination condition is satisfied,
wherein the process of the main program continues until the subsequent processing code ends even when the first GUI screen of the main program is closed, and the subsequent processing code continues for operation asynchronously with the first GUI screen display, and
wherein the termination condition includes termination of a predetermined subsequent program and the processor is configured to terminate the subsequent processing code when the termination condition is determined to be satisfied in accordance with the subsequent processing code.

2. The information processing apparatus according to claim 1, wherein the program termination information includes an identifier and a return value of the program.

3. The information processing apparatus according to claim 2, wherein the identifier of the program includes a file name of the program.

4. The information processing apparatus according to claim 2, wherein the return value of the program includes an execution result of the program.

5. The information processing apparatus according to claim 2, wherein the subsequent processing code includes designation of the subsequent program that is linked to the identifier and the return value of the program.

6. The information processing apparatus according to claim 1, wherein
the storage device further includes an application table, and the processor is configured to write the program termination information in the application table and specify the subsequent program by reading out the application table in accordance with the subsequent processing code.

7. The information processing apparatus according to claim 1, wherein
the storage device further includes a condition table, and
the processor is configured to read out the condition table in accordance with the subsequent processing code to specify the subsequent program.

8. The information processing apparatus according to claim 7, wherein
the program termination information includes an identifier and a return value of the program, and
the condition table is configured to link the subsequent program to the identifier and the return value of the program.

9. The information processing apparatus according to claim 1, wherein
the program is included in a software development kit (SDK),
the main program includes a simulator for a development program installed in an electronic device,
the first subsequent program includes a builder compiling the development program, and
the second subsequent program includes a packaging tool for preparing an installation package of the development program.

10. The information processing apparatus according to claim 9, wherein
the electronic device includes an image forming device, and
the development program includes an application program to be installed in the image forming device.

11. The information processing apparatus according to claim 1, wherein
the program is included in a software development kit (SDK),
the main program includes a builder for compiling a development program installed in an electronic device,
the first subsequent program includes a packaging tool for preparing an installation package of the development program, and
the second subsequent program includes an installer for remotely installing the development program in the electronic device using the installation package.

12. The information processing apparatus according to claim 11, wherein
the electronic device includes an image forming device, and
the development program includes an application program to be installed in the image forming device.

13. The information processing apparatus according to claim 1, wherein the information processing apparatus is a personal computer.

14. A non-transitory recording medium storing a program including a main program and N subsequent programs, where N represents a natural number greater than one, the program causing a processor to execute the following steps of:
displaying a first graphical user interface (GUI) screen on a display device in a first thread in a process of the main program;
terminating the main program after executing a subsequent processing code in a second thread in the process of the main program;
writing program termination information in a storage device when the main program is terminated;
displaying a second GUI screen on the display device in accordance with a first subsequent program that is specified by the subsequent processing code on the basis of the program termination information and that is executed after the main program; and
sequentially displaying third and subsequent GUI screens on the display device, in accordance with N−1 subsequent programs subsequent to the second subsequent program that is executed after the first subsequent program, until a termination condition is satisfied,
wherein the process of the main program continues until the subsequent processing code ends even when the first GUI screen of the main program is closed, and the subsequent processing code continues for operation asynchronously with the first GUI screen display, and
wherein the termination condition includes termination of a predetermined subsequent program and the processor is configured to terminate the subsequent processing code when the termination condition is determined to be satisfied in accordance with the subsequent processing code.

15. The non-transitory recording medium according to claim 14, wherein
the program is included in a software development kit (SDK),
the main program includes a simulator for a development program installed in an electronic device,
the first subsequent program includes a builder compiling the development program, and
the second subsequent program includes a packaging tool for preparing an installation package of the development program.

16. The non-transitory recording medium according to claim 14, wherein
the program is included in a software development kit (SDK),
the main program includes a builder for compiling (building) a development program installed in an electronic device,
the first subsequent program includes a packaging tool for preparing an installation package of the development program, and
the second subsequent program includes an installer for remotely installing the development program in the electronic device using the installation package.

17. The non-transitory recording medium according to claim 14, wherein the non-transitory recording medium is a non-volatile semiconductor memory.

18. The non-transitory recording medium according to claim 14, wherein the non-transitory recording medium is a hard-disk drive device.

* * * * *